US011860562B2

(12) United States Patent
Iijima et al.

(10) Patent No.: US 11,860,562 B2
(45) Date of Patent: Jan. 2, 2024

(54) IMAGE FORMING APPARATUS

(71) Applicant: FUJIFILM Business Innovation Corp., Tokyo (JP)

(72) Inventors: Chihiro Iijima, Kanagawa (JP); Yoshiki Matsuzaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 72 days.

(21) Appl. No.: 17/590,360

(22) Filed: Feb. 1, 2022

(65) Prior Publication Data

US 2023/0060717 A1 Mar. 2, 2023

(30) Foreign Application Priority Data

Aug. 25, 2021 (JP) ................................ 2021-137625

(51) Int. Cl.
*G03G 15/00* (2006.01)
*G03G 15/16* (2006.01)

(52) U.S. Cl.
CPC ................................ *G03G 15/6529* (2013.01)

(58) Field of Classification Search
CPC ........ G03G 15/00; G03G 15/01; G03G 15/16; G03G 15/65; G03G 15/6529
See application file for complete search history.

(56) References Cited

U.S. PATENT DOCUMENTS 8,126,380 B2 2/2012 Kawano et al.
2003/0108366 A1 6/2003 Yamada et al.
2007/0280728 A1* 12/2007 Sezaki ............... G03G 21/1628 399/303
2015/0078792 A1 3/2015 Aoyagi et al.
2017/0275111 A1* 9/2017 Nakajima .............. B65H 5/021

FOREIGN PATENT DOCUMENTS

EP 2003512 A2 12/2008
JP S63-11967 A 1/1988
JP 2002-108045 A 4/2002
JP 2009-080325 A 4/2009
JP 2013231959 A * 11/2013 ......... G03G 15/0136
JP 2014219528 A * 11/2014 ............. G03G 15/16

OTHER PUBLICATIONS

Nov. 22, 2022 Search Report issued in European Patent Application No. 22166238.0.

* cited by examiner

*Primary Examiner* — Nguyen Q. Ha
(74) *Attorney, Agent, or Firm* — Oliff PLC

(57) ABSTRACT

An image forming apparatus includes an image forming target to be transported along one direction, three or more image formers arranged away from each other along the one direction and configured to form images on the image forming target, and an image forming target winding motion correcting roller rotatably in contact with an inner peripheral surface of the image forming target and positioned on a downstream side of the image former at an upstream end in a transport direction of the image forming target so that plural image formers are positioned on a downstream side of the image forming target winding motion correcting roller. A distance between the plural image formers positioned on the downstream side of the image forming target winding motion correcting roller is an integral multiple of an outer peripheral length of the image forming target winding motion correcting roller.

20 Claims, 4 Drawing Sheets

IMAGE FORMING APPARATUS

CROSS-REFERENCE TO RELATED APPLICATIONS

This application is based on and claims priority under 35 USC 119 from Japanese Patent Application No. 2021-137625 filed Aug. 25, 2021.

BACKGROUND

(i) Technical Field

The present disclosure relates to an image forming apparatus.

(ii) Related Art

Japanese Unexamined Patent Application Publication No. 63-11967 discloses an image forming apparatus including a plurality of image formers around an annular belt to be circulated by a driving roller and configured to transport paper (image forming target) to be subjected to image formation. The image formers face the belt and form images on the paper.

SUMMARY

Aspects of non-limiting embodiments of the present disclosure relate to the following circumstances. The image forming apparatus may have an image forming target winding motion correcting roller that corrects a winding motion of the image forming target.

It is appropriate to suppress an increase in a misalignment amount of images formed on the image forming target by a plurality of image formers positioned on a downstream side of the image forming target winding motion correcting roller in a transport direction of the image forming target compared with a case where the distance between the image formers positioned on the downstream side of the image forming target winding motion correcting roller is not an integral multiple of the outer peripheral length of the image forming target winding motion correcting roller.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus comprising an image forming target to be transported along one direction, three or more image formers arranged away from each other along the one direction and configured to form images on the image forming target, and an image forming target winding motion correcting roller rotatably in contact with an inner peripheral surface of the image forming target and positioned on a downstream side of the image former at an upstream end in a transport direction of the image forming target so that a plurality of the image formers are positioned on a downstream side of the image forming target winding motion correcting roller, wherein a distance between the plurality of the image formers positioned on the downstream side of the image forming target winding motion correcting roller is an integral multiple of an outer peripheral length of the image forming target winding motion correcting roller.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure is described in detail below with reference to the drawings. An upstream side in a transport direction of recording paper P that is an example of a recording medium may hereinafter be referred to simply as "upstream side". A downstream side in the transport direction may hereinafter be referred to simply as "downstream side". An upstream side in a circulating direction (transport direction) of a transfer belt (belt) (image forming target) 52 may hereinafter be referred to simply as "upstream side". A downstream side in the circulating direction (transport direction) may hereinafter be referred to simply as "downstream side".

Figure 1:
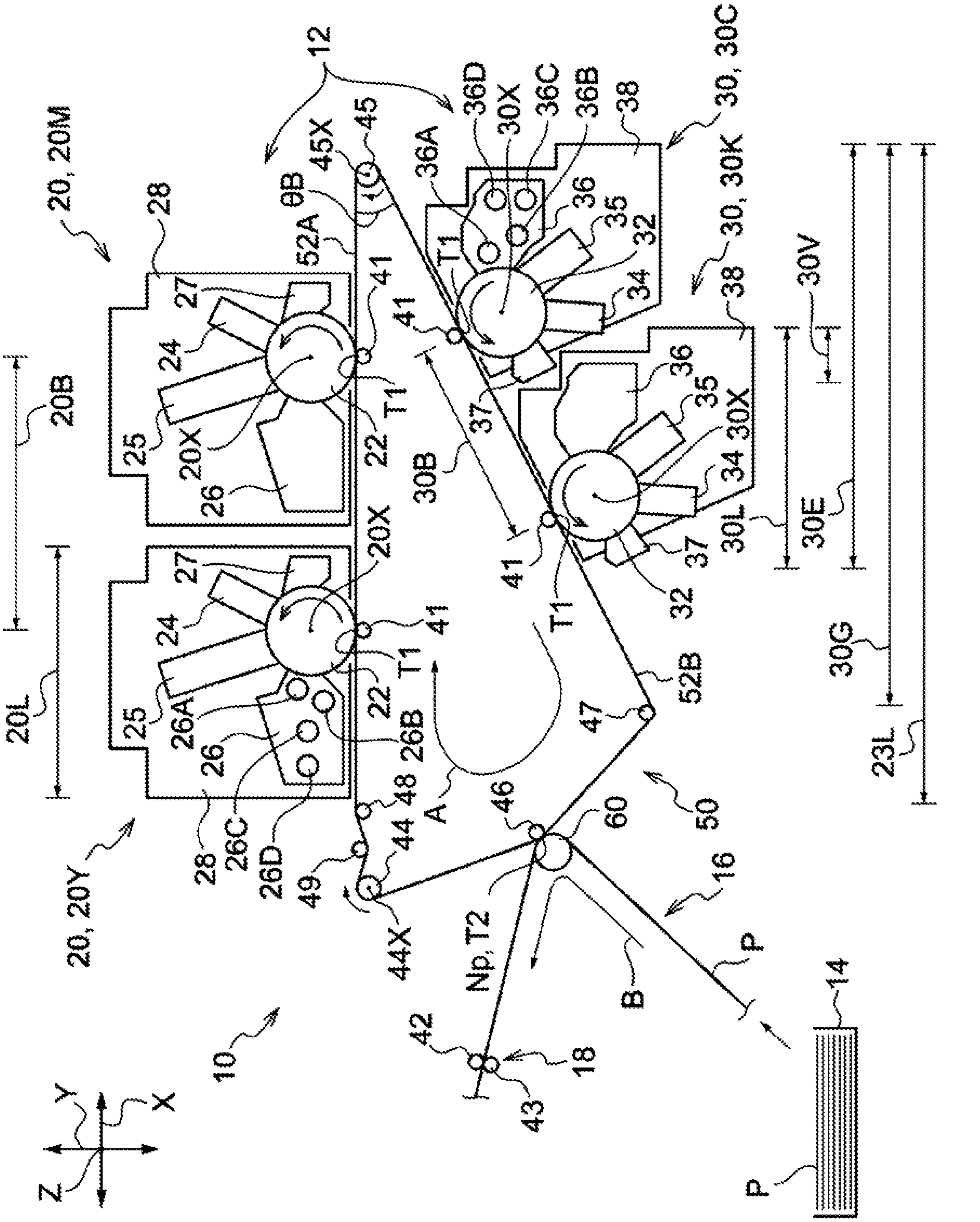
FIG. 1 is a schematic structural view illustrating an image forming apparatus according to an exemplary embodiment.

As illustrated in FIG. 1, an image forming apparatus 10 uses, for example, an electrophotographic system that forms a toner image (example of an image) on the recording paper P. The image forming apparatus 10 includes an image forming unit 12, a container 14, a transporter 16, and a fixing device 18 in an apparatus body (not illustrated). The components of the image forming apparatus 10 (image forming unit 12, container 14, transporter 16, and fixing device 18) are described below.

In the following description, a width direction (horizontal direction) of the apparatus body is an X direction, an up-and-down direction (vertical direction) of the apparatus body is a Y direction, and a direction orthogonal to the X direction and the Y direction (direction orthogonal to each drawing sheet) is a Z direction.

<Image Forming Unit>

The image forming unit 12 has a function of forming toner images on the recording paper P. Specifically, the image forming unit 12 includes first photoconductor units 20, second photoconductor units 30, and a transfer device 50.

[Photoconductor Units]

As illustrated in FIG. 1, two first photoconductor units 20 and two second photoconductor units 30 are provided. The first photoconductor units 20 and the second photoconductor units 30 are detachable from the apparatus body. The image forming apparatus 10 of this exemplary embodiment includes first photoconductor units 20Y and 20M for two colors that are yellow (Y) and magenta (M), and second photoconductor units 30C and 30K for two colors that are cyan (C) and black (K).

To distinguish yellow (Y), magenta (M), cyan (C), and black (K), the reference numerals of the members may be suffixed with letters "Y", "M", "C", and "K". Without the color distinction, the letters "Y", "M", "C", and "K" may be omitted.

In the transfer device 50 described later, the transfer belt 52 made of an elastic material has two straight portions shaped straight when viewed in the Z direction. The two straight portions are an upper portion 52A and a lower portion 52B. When viewed in the Z direction, the upper portion 52A extends along the X direction, and the lower portion 52B is inclined with respect to the X direction. That is, when viewed in the Z direction, an angle θB (see FIG. 1) between the lower portion 52B and the X direction is an acute angle and is larger than an angle θA (not illustrated) between the upper portion 52A and the X direction. The angle θA is 0° or an acute angle slightly larger than 0°. When viewed in the Z direction, the upper portion 52A and the lower portion 52B are arranged in the Y direction. The term "straight portion" in this specification and in the claims is not limited to a portion shaped completely straight. For example, the upper portion 52A positioned between a steering roller 45 and a loop roller 48 described later is slightly concave at a part pushed by two first photoconductor drums 22 and two first transfer rollers 41, but corresponds to the "straight portion". Similarly, the lower portion 52B positioned between the steering roller 45 and a loop roller 47 is slightly concave at a part pushed by two second photoconductor drums 32 and two first transfer rollers 41, but corresponds to the "straight portion".

The two first photoconductor units 20 face the outer peripheral surface (upper surface) of the upper portion 52A, and are arranged in the X direction along the upper portion 52A. In particular, the two first photoconductor units 20 are arranged so that the flat lower surfaces of support plates 28 of the first photoconductor units 20 described later are parallel to the outer peripheral surface (upper surface) of the upper portion 52A. The lower surface of the support plate 28 and the outer peripheral surface of the upper portion 52A face each other in the Y direction at a short distance therebetween. Each first photoconductor unit 20 includes the first photoconductor drum 22 that rotates in one direction (e.g., a counterclockwise direction in FIG. 1). Each first photoconductor drum 22 is rotatable about a rotation axis 20X extending in the Z direction. When viewed in the Z direction, a distance (adjacency distance) between the rotation axes 20X of the two first photoconductor units 20 is a first distance 20B. Each first photoconductor unit 20 includes a first charger 24, a first exposer 25, a first developer 26, and a first remover 27 in order from an upstream side in the rotating direction of the first photoconductor drum 22. Each first photoconductor unit 20 includes a pair of support plates 28 spaced away from each other in the Z direction. In FIG. 1, illustration of one support plate 28 is omitted. The first charger 24, the first exposer 25, the first developer 26, and the first remover 27 extend in the Z direction. Both ends of each of the first charger 24, the first exposer 25, the first developer 26, and the first remover 27 in the Z direction are supported by the pair of support plates 28. Relative movement of the pair of support plates 28 is restricted. As illustrated in FIG. 1, the dimension of each first photoconductor unit 20 in the X direction is a horizontal dimension 20L.

The two second photoconductor units 30 face the outer peripheral surface (lower surface) of the lower portion 52B, and are arranged along the lower portion 52B. Each second photoconductor unit 30 includes the second photoconductor drum 32 that rotates in one direction (e.g., a counterclockwise direction in FIG. 1). Each second photoconductor drum 32 is rotatable about a rotation axis 30X extending in the Z direction. When viewed in the Z direction, a distance (adjacency distance) between the rotation axes 30X of the two second photoconductor units 30 is a second distance 30B. Each second photoconductor unit 30 includes a second charger 34, a second exposer 35, a second developer 36, and a second remover 37 in order from an upstream side in the rotating direction of the second photoconductor drum 32. Each second photoconductor unit 30 includes a pair of second support plates 38 spaced away from each other in the Z direction. In FIG. 1, illustration of one second support plate 38 is omitted. The second charger 34, the second exposer 35, the second developer 36, and the second remover 37 extend in the Z direction. Both ends of each of the second charger 34, the second exposer 35, the second developer 36, and the second remover 37 in the Z direction are supported by the pair of second support plates 38. Relative movement of the pair of second support plates 38 is restricted. As illustrated in FIG. 1, the dimension of each second photoconductor unit 30 in the X direction is a horizontal dimension 30L.

The term "image former" in this specification and in the claims causes a toner or ink to adhere to the image forming target (e.g., the transfer belt 52). That is, the first photoconductor drum 22 of the first photoconductor unit 20 corresponds to the "image former", and the second photoconductor drum 32 of the second photoconductor unit 30 corresponds to the "image former". That is, the first charger 24, the first exposer 25, the first developer 26, and the first remover 27 do not correspond to the "image former". Similarly, the second charger 34, the second exposer 35, the second developer 36, and the second remover 37 do not correspond to the "image former". When the image forming apparatus 10 uses an ink jet system as described later, an ink jet head corresponds to the "image former".

As illustrated in FIG. 1, the first developer 26 includes a developing roller 26A, a collection auger 26B, a supply auger 26C, and a stirring auger 26D. Similarly, the second developer 36 includes a developing roller 36A, a collection auger 36B, a supply auger 36C, and a stirring auger 36D. The supply auger 26C and the stirring auger 26D are arranged in the X direction. The supply auger 36C and the stirring auger 36D are arranged in the Y direction. Therefore, the horizontal dimension of the second developer 36 is smaller than the horizontal dimension of the first developer 26. Thus, the horizontal dimension 30L is smaller than the horizontal dimension 20L.

As illustrated in FIG. 1, the two first photoconductor units 20 are arranged in the X direction when viewed in the Z direction. That is, the two first photoconductor units 20 are not arranged in the Y direction. When viewed in the Z direction, the two second photoconductor units 30 are partly arranged in the Y direction. In FIG. 1, a horizontal dimension 30V is a dimension of the parts of the two second photoconductor units 30 in the X direction. In FIG. 1, a horizontal dimension 30E is a horizontal dimension of a portion including the two second photoconductor units 30. In FIG. 1, a horizontal dimension 30G is a horizontal dimension of a portion including the lower portion 52B and the two second photoconductor units 30.

In each first photoconductor unit 20, the first charger 24 charges the outer peripheral surface of the first photoconductor drum 22. The first exposer 25 exposes the charged outer peripheral surface of the first photoconductor drum 22 to light to form an electrostatic latent image on the outer peripheral surface of the first photoconductor drum 22. The first developer 26 develops the formed electrostatic latent image to form a toner image. After the toner image is transferred onto the transfer belt 52, the first remover 27 removes the residual toner on the outer peripheral surface of the first photoconductor drum 22.

In each second photoconductor unit 30, the second charger 34 charges the outer peripheral surface of the second photoconductor drum 32. The second exposer 35 exposes the charged outer peripheral surface of the second photoconductor drum 32 to light to form an electrostatic latent image on the outer peripheral surface of the second photoconductor drum 32. The second developer 36 develops the formed electrostatic latent image to form a toner image. After the toner image is transferred onto the transfer belt 52, the second remover 37 removes the residual toner on the outer peripheral surface of the second photoconductor drum 32.

[Transfer Device]

As illustrated in FIG. 1, the transfer device 50 includes four first transfer rollers 41 that are examples of a first transferer, the transfer belt 52 that is an example of an intermediate transferer, and a transfer barrel 60 that is an example of a second transferer. In the transfer device 50, the toner images formed on the outer peripheral surfaces of the first photoconductor drums 22 are firstly transferred onto the transfer belt 52 while being laid over one another, and the laid toner images are secondly transferred onto the recording paper P.

(First Transfer Rollers)

As illustrated in FIG. 1, each first transfer roller 41 facing the upper portion 52A transfers the toner image formed on the outer peripheral surface of each first photoconductor drum 22 onto the outer peripheral surface of the transfer belt 52 at a first transfer position T1 between the first photoconductor drum 22 and the first transfer roller 41. Each first transfer roller 41 facing the lower portion 52B transfers the toner image formed on the outer peripheral surface of each second photoconductor drum 32 onto the outer peripheral surface of the transfer belt 52 at a first transfer position T1 between the second photoconductor drum 32 and the first transfer roller 41. A distance between the first transfer positions T1 of the two first photoconductor drums 22 corresponds to the first distance 20B. Similarly, a distance between the first transfer positions T1 of the two second photoconductor drums 32 corresponds to the second distance 30B. In this exemplary embodiment, the toner image formed on the outer peripheral surface of the first photoconductor drum 22 is transferred onto the outer peripheral surface of the transfer belt 52 at the first transfer position T1 by applying a first transfer voltage between the first transfer roller 41 and the first photoconductor drum 22. Similarly, the toner image formed on the outer peripheral surface of the second photoconductor drum 32 is transferred onto the outer peripheral surface of the transfer belt 52 at the first transfer position T1 by applying the first transfer voltage between the first transfer roller 41 and the second photoconductor drum 32.

(Transfer Belt)

As illustrated in FIG. 1, the transfer belt 52 has an annular shape so that the toner images are transferred onto the outer peripheral surface, and is looped around a driving roller 44, the steering roller 45, a backup roller 46, the loop roller 47, the loop roller 48, and a push roller 49 to determine the posture. The steering roller 45 is an example of a belt winding motion correcting roller (image forming target winding motion correcting roller).

The driving roller 44 having a circular cross section is driven by a driver (not illustrated) to rotate about an axis 44X extending in the Z direction, thereby circulating the transfer belt 52 in a circulating direction indicated by an arrow A at a predetermined speed.

The diameter of the steering roller 45 having a circular cross section is equal to the diameter of the driving roller 44 within a tolerance. In other words, an outer peripheral length 45C of the steering roller 45 is equal to an outer peripheral length 44C of the driving roller 44 within a tolerance. The steering roller 45 is rotatable about an axis 45X extending in the Z direction. The steering roller 45 is configured to swivel about a center in the direction of the axis 45X. Therefore, the steering roller 45 suppresses a winding motion of the transfer belt 52.

Each of the first distance 20B between the two first photoconductor drums 22 and the second distance 30B between the two second photoconductor drums 32 is set to an integral multiple of each of the outer peripheral length 44C of the driving roller 44 and the outer peripheral length 45C of the steering roller 45. The second distance 30B is shorter than the first distance 20B. For example, in this exemplary embodiment, the first distance 20B is set to four times as large as each of the outer peripheral length 44C and the outer peripheral length 45C, and the second distance 30B is set to three times as large as each of the outer peripheral length 44C and the outer peripheral length 45C.

A distance along the transfer belt 52 between the first transfer position T1 of the first photoconductor drum 22 on the downstream side and the first transfer position T1 of the second photoconductor drum 32 on the upstream side differs from the first distance 20B and the second distance 30B. That is, the distance along the transfer belt 52 between the first transfer position T1 of the first photoconductor drum 22 on the downstream side and the first transfer position T1 of the second photoconductor drum 32 on the upstream side does not correspond to the "adjacency distance (first distance, second distance)" in the claims. The distance along the transfer belt 52 between the first transfer position T1 of the first photoconductor drum 22 on the downstream side and the first transfer position T1 of the second photoconductor drum 32 on the upstream side is also set to an integral multiple of each of the outer peripheral length 44C of the driving roller 44 and the outer peripheral length 45C of the steering roller 45.

The backup roller 46 faces the transfer barrel 60 across the transfer belt 52. A contact area between the transfer barrel 60 and the transfer belt 52 is a nip area Np (see FIG. 1). The nip area Np is a second transfer position T2 where the toner images are transferred from the transfer belt 52 onto the recording paper P.

Figure 2:
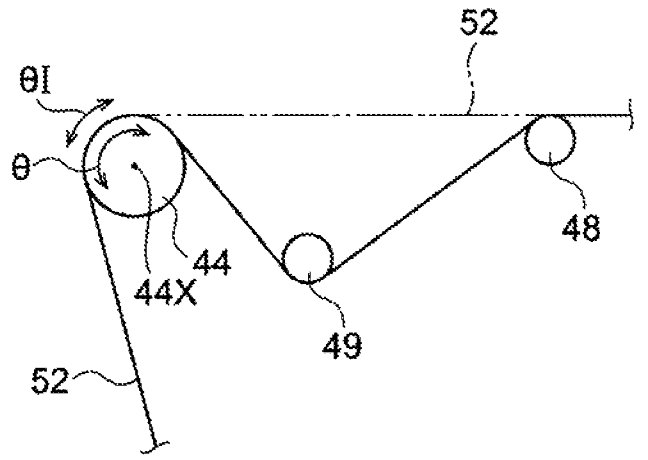
FIG. 2 is a side view illustrating a transfer belt, a driving roller, a loop roller, and a push roller according to the exemplary embodiment.

The loop roller 47 positioned on a downstream side of the second photoconductor unit 30K and on an upstream side of the backup roller 46 is rotatably in contact with the inner peripheral surface of the transfer belt 52. The loop roller 48 positioned on an upstream side of the first photoconductor unit 20Y and on a downstream side of the driving roller 44 is rotatably in contact with the inner peripheral surface of the transfer belt 52. The push roller 49 positioned on an upstream side of the loop roller 48 and on a downstream side of the driving roller 44 is rotatably in contact with the outer peripheral surface of the transfer belt 52 and pushes the transfer belt 52 toward the inner periphery. If the push roller 49 is not provided, a portion of the transfer belt 52 between the driving roller 44 and the loop roller 48 is shaped as indicated by an imaginary line in FIG. 2. In this case, an overlap angle between the transfer belt 52 and the driving roller 44 is θI. In this exemplary embodiment, the overlap angle between the transfer belt 52 and the driving roller 44 is θ because the push roller 49 is provided. FIG. 2 demonstrates that the overlap angle θ is larger than the overlap angle θI.

<Transporter>

As illustrated in FIG. 1, the transporter 16 includes a transport device (not illustrated) that transports the recording paper P fed out from the container 14 in an arrow B direction. The transport device transports the recording paper P from the container 14 to the transfer barrel 60. After the toner images are secondly transferred onto the recording paper P passing over the transfer barrel 60 (second transfer position T2), the transport device transports the recording paper P to the fixing device 18.

<Fixing Device>

As illustrated in FIG. 1, the fixing device 18 includes a heating roller 42 that is an example of a heating member, and a pressurizing roller 43 that is an example of a pressurizing member. In the fixing device 18, the toner images transferred onto the recording paper P at the transfer barrel 60 are fixed onto the recording paper P by heating and pressurizing the recording paper P between the heating roller 42 and the pressurizing roller 43.

Next, the image forming apparatus 10 having the structure described above is described in detail.

In the image forming apparatus 10 of this exemplary embodiment, the second distance (adjacency distance) 30B between the rotation axes 30X of the two second photoconductor drums 32 (image formers) positioned on the downstream side of the steering roller 45 and on the upstream side of the transfer position for the recording paper P is an integral multiple of the outer peripheral length 45C of the steering roller 45.

In the image forming apparatus 10, each of the first distance 20B between the two first photoconductor drums 22 and the second distance 30B between the two second photoconductor drums 32 is set to an integral multiple of the outer peripheral length 44C of the driving roller 44.

The second distance 30B between the two second photoconductor drums 32 positioned on the downstream side of the first photoconductor drums 22 is shorter than the first distance 20B. In a comparative example (not illustrated) in which the first distance 20B is equal to the second distance 30B, the second distance 30B is adjusted to the first distance 20B. Therefore, a distance along the transfer belt 52 from the driving roller 44 to the second photoconductor unit 30K is shorter in this exemplary embodiment than in the comparative example. As this distance increases, the cumulative amounts of variation in the speed of the transfer belt 52 and variation in the adjacency distance increase. In the comparative example, the misregistration amount of the toner images on the second photoconductor unit 30C and the second photoconductor unit 30K tends to increase compared with the misregistration amount of the toner images on the first photoconductor unit 20Y and the first photoconductor unit 20M. In the exemplary embodiment, the distance between the second photoconductor unit 30C and the second photoconductor unit 30K (second distance 30B) is shorter than in the comparative example. Therefore, the cumulative amounts of the variation in the speed and the variation in the adjacency distance are smaller than in the comparative example.

The push roller 49 that is positioned between the driving roller 44 and the loop roller 48 and is rotatably in contact with the outer peripheral surface of the transfer belt 52 pushes the transfer belt 52 toward the inner periphery.

Figure 3:
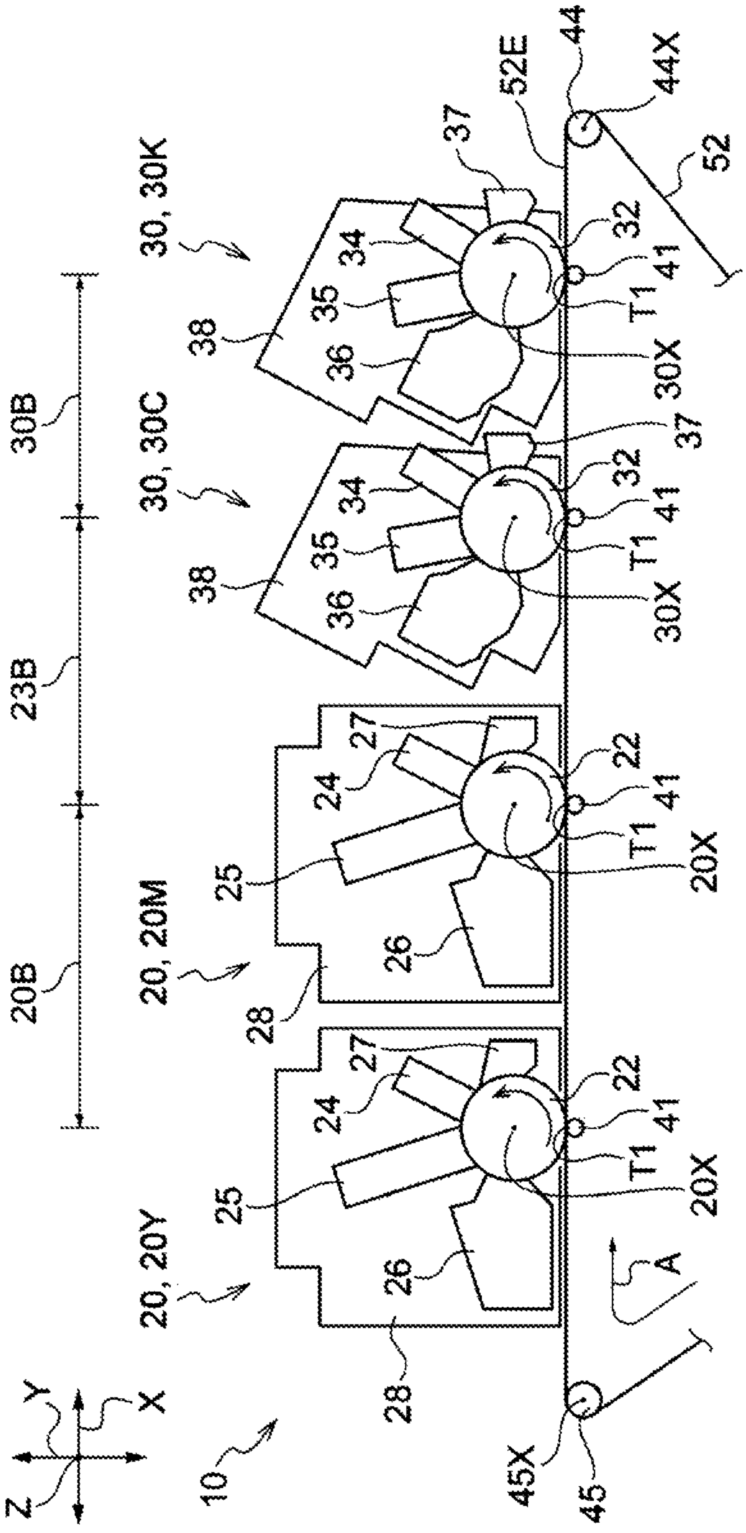
FIG. 3 is a schematic structural view illustrating a part of an image forming apparatus according to a first modified example of the exemplary embodiment.

For example, a transfer belt 52 of an image forming apparatus 10 according to a first modified example illustrated in FIG. 3 includes one straight portion 52E. In FIG. 3, illustration of the developing roller 26A, the collection auger 26B, the supply auger 26C, the stirring auger 26D, the developing roller 36A, the collection auger 36B, the supply auger 36C, and the stirring auger 26D is omitted. The end of the straight portion 52E on the upstream side is looped around the steering roller 45, and the end of the straight portion 52E on the downstream side is looped around the driving roller 44. That is, the steering roller 45 is positioned on the upstream side of the driving roller 44. This image forming apparatus 10 includes two first photoconductor units 20 and two second photoconductor units 30 arranged along the straight portion 52E. That is, all the photoconductor units (first photoconductor units 20 and second photoconductor units 30) of the image forming apparatus 10 are positioned on the downstream side of the steering roller 45 and on the upstream side of the driving roller 44.

An adjacency distance 23B between the rotation axis 20X of the first photoconductor drum 22 on the downstream side and the rotation axis 30X of the second photoconductor drum 32 on the upstream side is set to an integral multiple of each of the outer peripheral length 44C of the driving roller 44 and the outer peripheral length 45C of the steering roller 45. There is a relationship of first distance 20B>adjacency distance 23B>second distance 30B.

Figure 4:
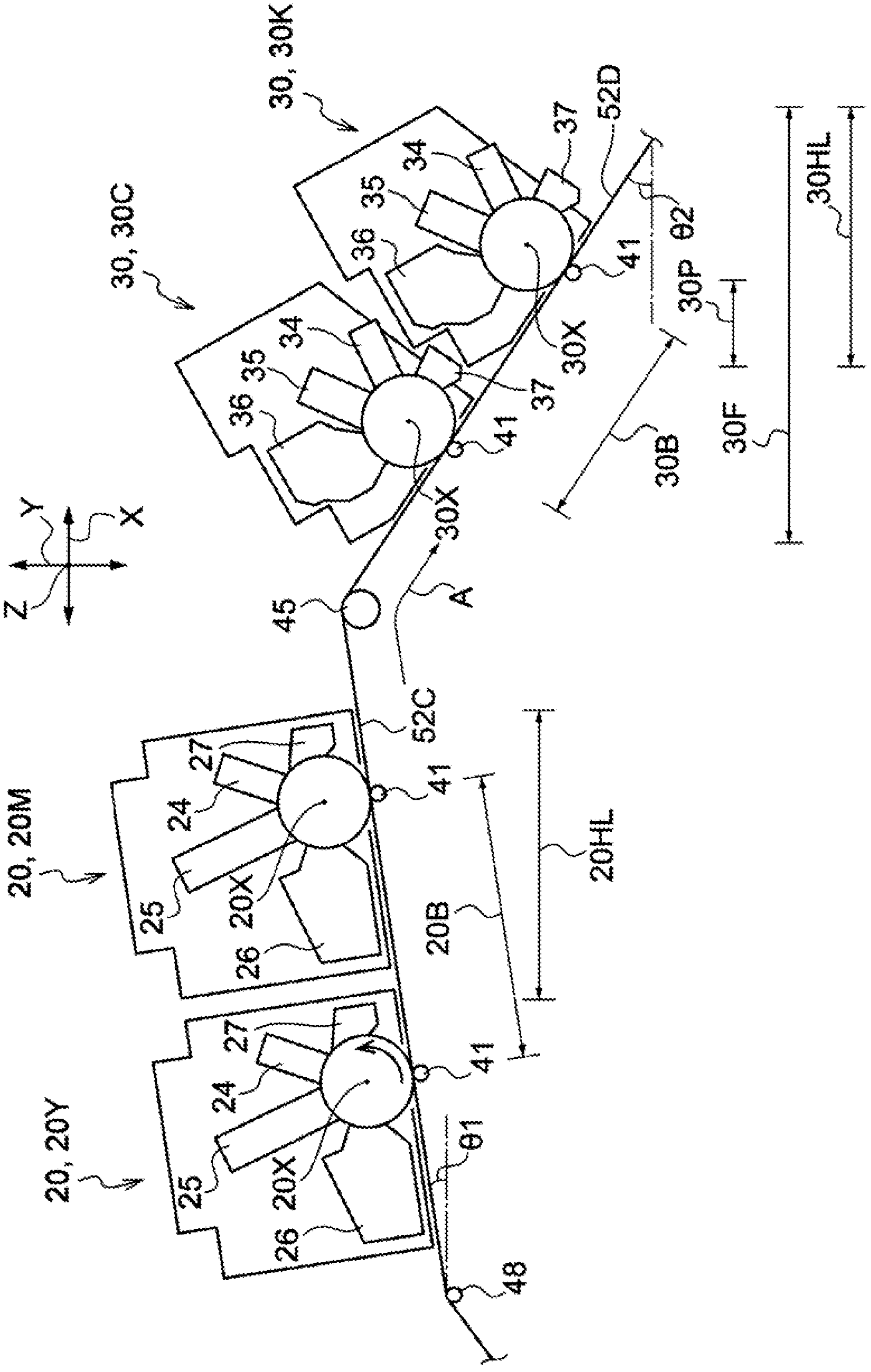
FIG. 4 is a schematic structural view illustrating a part of an image forming apparatus according to a second modified example of the exemplary embodiment.

FIG. 4 illustrates a second modified example of the exemplary embodiment of the present disclosure. In an image forming apparatus 10 of the second modified example, an acute angle between the X direction and an upstream portion 52C that is a straight portion of the transfer belt 52 positioned on an upstream side of the steering roller 45 and on a downstream side of the loop roller 48 is θ1. An acute angle between the X direction and a downstream portion 52D that is a straight portion positioned on a downstream side of the steering roller 45 and continuous with the upstream portion 52C is θ2 larger than θ1. FIG. 4 demonstrates that the upstream portion 52C and the downstream portion 52D are not arranged in the Y direction but are arranged in the X direction. Two first photoconductor units 20 are provided along the upper surface (outer peripheral surface) of the upstream portion 52C, and two second photoconductor units 30 are provided along the upper surface (outer peripheral surface) of the downstream portion 52D. The first photoconductor unit 20 of the second modified example has the same specifications as the first photoconductor unit 20 of the exemplary embodiment. The second photoconductor unit 30 of the second modified example has the same specifications as the second photoconductor unit 30 of the exemplary embodiment.

When viewed in the Z direction, a distance (adjacency distance) between the rotation axes 20X of the two first photoconductor units 20 is the first distance 20B. When viewed in the Z direction, a distance (adjacency distance) between the rotation axes 30X of the two second photoconductor units 30 is the second distance 30B. As illustrated in FIG. 4, the horizontal dimension of each first photoconductor unit 20 is 20HL, and the horizontal dimension of each second photoconductor unit 30 is 30HL. The horizontal dimension 30HL is smaller than the horizontal dimension 20HL.

When viewed in the Z direction, the two second photoconductor units 30 are partly arranged in the Y direction. In FIG. 4, a horizontal dimension 30P is a dimension of the parts of the two second photoconductor units 30 in the X direction. In FIG. 4, a dimension 30F is a dimension of a portion including the two second photoconductor units 30 in the X direction. The horizontal dimension 30P is larger than the horizontal dimension 30V in FIG. 1. Therefore, the horizontal dimension 30F is smaller than the horizontal dimension 30E in FIG. 1.

In the image forming apparatus 10 of the second modified example illustrated in FIG. 4, the angle θ2 is larger than the angle θ1. The two second photoconductor units 30 are provided along the downstream portion 52D. The second distance 30B is shorter than the first distance 20B. Therefore, the horizontal dimension of a portion including the downstream portion 52D and the two second photoconductor units 30 is small compared with a case where the downstream portion 52D is parallel to the horizontal direction and the second distance 30B is equal to the first distance 20B.

When viewed in the Z direction, the two second photoconductor units 30 are partly arranged in the Y direction. Therefore, the horizontal dimension 30F of the portion including the two second photoconductor units 30 is small compared with a case where the two second photoconductor units 30 are arranged away from each other in the X direction when viewed in the Z direction.

Any number of photoconductor drums (image formers) may be arranged along the transfer belt 52 as long as the number is three or more.

Any number of image formers may be provided in the area on the downstream side of the steering roller 45 and on the upstream side of the transfer position for the recording paper P as long as the number is plural.

In the image forming apparatus 10, the first photoconductor units 20 and the second photoconductor units 30 may form the toner images on the recording paper P (image forming target) transported by a transport belt (not illustrated) provided in place of the transfer belt 52.

The toner image is described as an example of the image, and is formed by a dry type electrophotographic system. The exemplary embodiment of the present disclosure is not limited thereto. For example, the toner image may be formed by a wet type electrophotographic system, or the image may be formed by an ink jet system.

In the image forming apparatus 10, an ink or toner image may be formed on long non-annular continuous paper (image forming target) placed over a plurality of rotators including the driving roller 44, having at least one straight portion by the rotators, and transported by the driving roller 44 and the rotators, and the steering roller (image forming target winding motion correcting roller) 45 may rotatably be in contact with the inner peripheral surface of the continuous paper.

In a case where the image forming apparatus 10 uses the ink jet system, each of a first distance between the centers of ink jet heads (image formers) corresponding to the first photoconductor units 20 and a second distance between the centers of ink jet heads (image formers) corresponding to the second photoconductor units 30 is set to an integral multiple of each of the outer peripheral length 44C and the outer peripheral length 45C.

In the case where the image forming apparatus 10 includes the first photoconductor units 20 and the second photoconductor units 30, the adjacency distances may be equal to each other within a tolerance. In the case where the image forming apparatus 10 includes the ink jet heads, the adjacency distances may similarly be equal to each other within a tolerance.

Both in the cases where the image forming apparatus 10 includes the first photoconductor units 20 and the second photoconductor units 30 and where the image forming apparatus 10 includes the ink jet heads, each adjacency distance need not be an integral multiple of each of the outer peripheral length 44C and the outer peripheral length 45C.

The diameter of the steering roller 45 may differ from the diameter of the driving roller 44. Also in this case, the diameter of the steering roller 45 and the diameter of the driving roller 44 may be set so that each adjacency distance is an integral multiple of each of the outer peripheral length 45C and the outer peripheral length 44C.

The colors of the images (toner or ink images) to be formed on the image forming target (transfer belt 52 or recording medium P) need not be four colors. For example, six colors may be used for the images.

For example, in a case where three or more first photoconductor units 20 are arranged along the upper portion 52A or the upstream portion 52C, all the plurality of first distances may be equal to each other within a tolerance, or at least one first distance may differ from the other first distance. In the claims, description "all the first distances are equal to each other" means that all the plurality of first distances are equal to each other within the tolerance. For example, the first distance between the first photoconductor unit 20 at the downstream end and the first photoconductor unit 20 adjacent to this first photoconductor unit 20 may be shorter than the first distance between the first photoconductor unit 20 at the upstream end and the first photoconductor unit 20 adjacent to this first photoconductor unit 20.

For example, in a case where three or more second photoconductor units 30 are arranged along the lower portion 52B or the downstream portion 52D, all the plurality of second distances may be equal to each other within a tolerance, or at least one second distance may differ from the other second distance. In the claims, description "all the second distances are equal to each other" means that all the plurality of second distances are equal to each other within the tolerance. For example, the second distance between the second photoconductor unit 30 at the downstream end and the second photoconductor unit 30 adjacent to this second photoconductor unit 30 may be shorter than the second distance between the second photoconductor unit 30 at the upstream end and the second photoconductor unit 30 adjacent to this second photoconductor unit 30.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:

an image forming target to be transported along one direction;

at least first, second, and third image formers arranged away from each other along the one direction and configured to form images on the image forming target; and an image forming target winding motion correcting roller rotatably in contact with an inner peripheral surface of the image forming target and positioned on a downstream side of the first image former and an upstream inside of the second and third image formers relative to the one direction, wherein a first distance between the second and third image formers positioned on a downstream side of the image forming target winding motion correcting roller is an integral multiple of an outer peripheral length of the image forming target winding motion correcting roller.

2. An image forming apparatus comprising:

an annular belt configured to circulate in one direction;

at least first, second, and third image formers arranged away from each other along the belt and configured to form images on an image forming target that is the belt or a recording medium transported by the belt; and a belt winding motion correcting roller rotatably in contact with an inner peripheral surface of the belt and positioned on a downstream side of the first image former and an upstream side of the second and third image formers relative to the one direction, wherein a first distance between the second and third image formers positioned on a downstream side of the belt winding motion correcting roller is an integral multiple of an outer peripheral length of the belt winding motion correcting roller.

3. The image forming apparatus according to claim 2, further comprising a driving roller rotatably in contact with the inner peripheral surface of the belt and configured to circulate the belt, wherein the first distance between the second and third image formers is an integral multiple of an outer peripheral length of the driving roller.

4. The image forming apparatus according to claim 3, wherein the driving roller is positioned on an upstream side of the belt winding motion correcting roller, wherein a second distance between the first image former and a fourth image former positioned on a downstream side of the driving roller and on an upstream side of the belt winding motion correcting roller is an integral multiple of the outer peripheral length of the driving roller, and wherein the first distance between the second and third image formers positioned on the downstream side of the belt winding motion correcting roller is shorter than the second distance.

5. The image forming apparatus according to claim 4, wherein the first image former, the fourth image former, and a fifth image former positioned on the downstream side of the driving roller and on the upstream side of the belt winding motion correcting roller are arranged along one straight portion of the belt, the fifth image former and the first image former being separated by the second distance.

6. The image forming apparatus according to claim 5, wherein the second image former, third image former, and a sixth image former positioned on the downstream side of the belt winding motion correcting roller are arranged along another straight portion different from the one straight portion of the belt, the sixth image former and the second image former being separated by the first distance.

7. The image forming apparatus according to claim 3, further comprising:

a loop roller rotatably in contact with the inner peripheral surface of the belt; and a push roller positioned between the driving roller and the loop roller, rotatably in contact with an outer peripheral surface of the belt, and configured to push the belt toward an inner periphery.

8. The image forming apparatus according to claim 4, further comprising:

a loop roller rotatably in contact with the inner peripheral surface of the belt; and a push roller positioned between the driving roller and the loop roller, rotatably in contact with an outer peripheral surface of the belt, and configured to push the belt toward an inner periphery.

9. The image forming apparatus according to claim 5, further comprising:

a loop roller rotatably in contact with the inner peripheral surface of the belt; and a push roller positioned between the driving roller and the loop roller, rotatably in contact with an outer peripheral surface of the belt, and configured to push the belt toward an inner periphery.

10. The image forming apparatus according to claim 6, further comprising:

a loop roller rotatably in contact with the inner peripheral surface of the belt; and a push roller positioned between the driving roller and the loop roller, rotatably in contact with an outer peripheral surface of the belt, and configured to push the belt toward an inner periphery.

11. The image forming apparatus according to claim 1, wherein the at least first, second, and third image formers are photoconductor drums configured to transfer toner images onto the image forming target, and wherein the first distance is a distance between rotation axes of the second and third image formers.

12. The image forming apparatus according to claim 2, wherein the at least first, second, and third image formers are photoconductor drums configured to transfer toner images onto the image forming target, and wherein the first distance is a distance between rotation axes of the second and third image formers.

13. The image forming apparatus according to claim 3, wherein the at least first, second, and third image formers are photoconductor drums configured to transfer toner images onto the image forming target, and wherein the first distance is a distance between rotation axes of the second and third image formers.

14. The image forming apparatus according to claim 4, wherein the first, second, third, and fourth image formers are photoconductor drums configured to transfer toner images onto the image forming target, and wherein the first distance is a distance between rotation axes of the second and third image formers and the second distance is a distance between rotation axes of the first and fourth image formers.

15. The image forming apparatus according to claim 5, wherein the first, second, third, fourth, and fifth image formers are photoconductor drums configured to transfer toner images onto the image forming target, and wherein the first distance is a distance between rotation axes of the second and third image formers and the second distance is a distance between rotation axes of the first and fourth image formers and between the rotation axes of the first image former and a rotation axis of the fifth image former.

16. The image forming apparatus according to claim 6, wherein the first, second, third, fourth, fifth, and sixth image formers are photoconductor drums configured to transfer toner images onto the image forming target, and wherein the first distance is a distance between rotation axes of the second and third image formers and between the rotation axis of the second image former and a rotation axis of the sixth image former, and the second distance is a distance between rotation axes of the first and fourth image formers and between the rotation axis of the first image former and a rotation axis of the fifth image former.

17. The image forming apparatus according to claim 7, wherein the at least first, second, and third image formers are photoconductor drums configured to transfer toner images onto the image forming target, and wherein the first distance is a distance between rotation axes of the second and third image formers.

18. The image forming apparatus according to claim 8, wherein the first, second, third, and fourth image formers are photoconductor drums configured to transfer toner images onto the image forming target, and wherein the first distance is a distance between rotation axes of the second and third image formers and the second distance is a distance between rotation axes of the first and fourth image formers.

19. The image forming apparatus according to claim 9, wherein the first, second, third, fourth, and fifth image formers are photoconductor drums configured to transfer toner images onto the image forming target, and wherein the first distance is a distance between rotation axes of the second and third image formers and the second distance is a distance between rotation axes of the first and fourth image formers.

20. An image forming apparatus comprising:

an image forming target to be transported along one direction;

a plurality of image formers arranged away from each other along the one direction and configured to form images on the image forming target; and an image forming target winding motion correcting roller rotatably in contact with an inner peripheral surface of the image forming target and positioned on an upstream side of | the plurality of image formers in the one direction of the image forming target, wherein a distance between the plurality of image formers is an integral multiple of an outer peripheral length of the image forming target winding motion correcting roller, a first distance between a first image former of the plurality of image formers and a second image former of the plurality of image formers is different from a second distance between the second image former and a third image former of the plurality of image formers, and the first image former, the second image former, and the third image former are arranged in order along the one direction and the second distance is shorter than the first distance.

* * * * *